US 8,869,245 B2

(12) United States Patent
Ranganathan et al.

(10) Patent No.: US 8,869,245 B2
(45) Date of Patent: Oct. 21, 2014

(54) DEVICE REPUTATION

(75) Inventors: Prashanth Ranganathan, San Francisco, CA (US); Alexander J. Olson, Menlo Park, CA (US); Frieder Bluemle, San Francisco, CA (US); Tobias Speckbacher, Menlo Park, CA (US)

(73) Assignee: eBay Inc., San Jose, CA (US)

( * ) Notice: Subject to any disclaimer, the term of this patent is extended or adjusted under 35 U.S.C. 154(b) by 75 days.

(21) Appl. No.: 13/415,184

(22) Filed: Mar. 8, 2012

(65) Prior Publication Data

US 2012/0233665 A1 Sep. 13, 2012

Related U.S. Application Data

(60) Provisional application No. 61/450,789, filed on Mar. 9, 2011.

(51) Int. Cl.
| | | |
|---|---|---|
| *H04L 29/06* | (2006.01) | |
| *G06F 21/00* | (2013.01) | |
| *G06F 21/33* | (2013.01) | |
| *G06F 21/51* | (2013.01) | |
| *G06F 3/12* | (2006.01) | |
| *G06F 21/50* | (2013.01) | |

(52) U.S. Cl.
CPC ............... *G06F 21/51* (2013.01); *G06F 21/33* (2013.01)
USPC ................. 726/4; 726/10; 713/156; 713/186; 705/44; 455/12.1

(58) Field of Classification Search
USPC ................ 726/4, 10; 713/156, 186; 455/12.1; 705/44
See application file for complete search history.

(56) References Cited

U.S. PATENT DOCUMENTS

| | | | | |
|---|---|---|---|---|
| 2003/0032391 | A1* | 2/2003 | Schweinhart et al. | ....... 455/12.1 |
| 2006/0212931 | A1* | 9/2006 | Shull et al. | ....................... 726/10 |
| 2009/0282241 | A1* | 11/2009 | Prafullchandra et al. | ..... 713/156 |
| 2010/0293094 | A1* | 11/2010 | Kolkowitz et al. | ............... 705/44 |
| 2010/0332391 | A1* | 12/2010 | Khan | ............................... 705/44 |

FOREIGN PATENT DOCUMENTS

WO    WO 2013166126 A1 * 11/2013

OTHER PUBLICATIONS

Hatzivasilis, G. ; Manifavas, C.;"Building Trust in Ad Hoc Distributed Resource-Sharing Networks Using Reputation-Based Systems"; Informatics (PCI), 2012 16th Panhellenic Conference on Digital Object Identifier: 10.1109/PCi.2012.28; Publication Year: Aug. 2012 , pp. 416-421.*

* cited by examiner

*Primary Examiner* — Kambiz Zand
*Assistant Examiner* — Courtney Fields
(74) *Attorney, Agent, or Firm* — Haynes and Boone, LLP

(57) ABSTRACT

A user device is associated with a dynamic trust score that may be updated as needed, where the trust score and the updates are based on various activities and information associated with the mobile device. The trust score is based on both parameters of the device, such as device type, registered device location, device phone number, device ID, the last time the device has been accessed, etc. and activities the device engages in, such as amount of transactions, dollar amount of transactions, amount of denied requests, amount of approved requests, location of requests, etc. Based on a transaction request from the user device, the trust score and a network reputation score is used to determine an overall trust/fraud score associated with the transaction request.

19 Claims, 5 Drawing Sheets

DEVICE REPUTATION

CROSS REFERENCE TO RELATED APPLICATION

The present application claims priority to U.S. Provisional Patent Appl. Ser. No. 61/450,789, filed Mar. 9, 2011, which is incorporated by reference in its entirety.

BACKGROUND

1. Field of the Invention

The present invention is related generally mobile devices and in particular to determining device reputation for trust for electronic payments.

2. Description of Related Art

Financial institutions, payment solution providers and merchants incur billions in losses each year from credit card and e-payment fraud. Fraud is particularly high in world of ecommerce where no payment instrument (like a plastic credit card or check or cash) is actually presented for verification and the actual identity of the user performing the transaction is impossible to verify. Determining whether a payment transaction should be considered as trustworthy or as fraudulent is a complex process, which may include requiring the user to authenticate through a user identifier and a password/PIN.

However, such credentials can be spoofed or otherwise obtained by non-authorized users. With more and more users making transactions and payments electronically, especially through mobile devices like smart phones, a need exists to better determine the authenticity or trustworthiness of a transaction request made through a user device.

SUMMARY

According to one embodiment, a user device is assigned a dynamic trust score that may be updated as needed, where the trust score and the updates are based on various activities and information associated with the mobile device. The trust score is based on both parameters of the device, such as device type, registered device location, device phone number, device ID, the last time the device has been accessed, etc. and activities the device engages in, such as amount of transactions, dollar amount of transactions, amount of denied requests, amount of approved requests, location of requests, etc. Because the trust or reputation score is dynamic, a system receiving a transaction from the device can have more accurate (e.g., more recent or current) information about the device. This will allow a more accurate assessment of the risk associated with the transaction request. For example, a higher trust score for the device may result in a more easily approved request, while a lower trust score may require the user to provide additional authentication or even a denial of the transaction request.

In another embodiment, a trust or reputation score of a network from which the device is attempting the transaction is used in conjunction with the device trust score. The network trust score may indicate the trustworthiness of an IP address from which the request is coming from and can be based on previous transaction requests (and results of the requests) made from the same or similar IP addresses. Other factors for the network trust score may include connection and routing type information (e.g., fixed connection or dialup), the number of unique devices (UUIDs) that connect over the same IP address, the country the IP address located in, whether the IP address is part of a particular network, and whether the IP address originates from a corporate network. The network trust score may also be dynamic and updated as events/activities warrant.

As a result, a transaction request from a user device can be assessed for authenticity beyond just the user login credentials. Because the device trust score and the network trust scores are dynamic, the assessment is more accurate than using initial or old scores, as the device may have been compromised during that period.

These and other features and advantages of the present invention will be more readily apparent from the detailed description of the embodiments set forth below taken in conjunction with the accompanying drawings.

Figure 1:
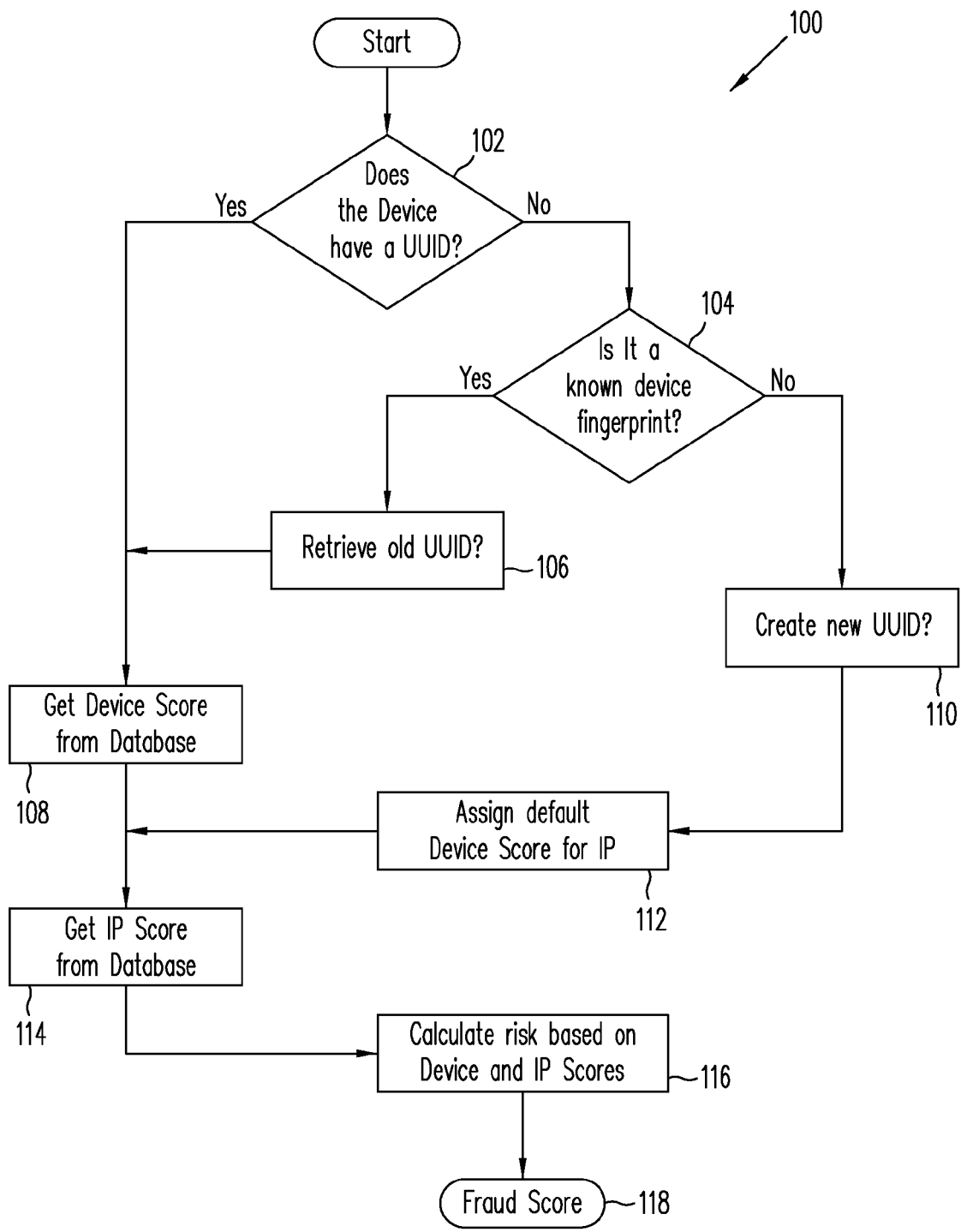
FIG. 1 is a flow diagram illustrating a process for assigning a fraud score according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various embodiments relate to device identification and reputation or trust. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments provide methods and systems for determining whether a transaction request, such as a payment request, should be considered as trustworthy or as fraudulent based on device identification and reputation. Trust or reputation scores are assigned to devices and networks participating in the transaction or transaction request. The trust is based, at least in part, on past transactions for both the specific device and the network (IP address block). The concepts of device reputation and IP or network reputation as well as how they are combined to form a single trust or fraud score are described below.

Device Fingerprinting

A device fingerprint may be based on a set of parameters that can be collected from a device that helps in identifying the device uniquely even when an immutable/unspoofable device identifier is not available. With regards to mobile devices, fingerprinting may be achieved by looking at various parameters. A non-exhaustive list of possible parameters is listed below:

| Parameter name | Description |
| --- | --- |
| app_guid | A unique installation identifier of the app. Should only change if the user uninstalls the app or wipes the device |
| app_id | Identifier of the app that is using the Risk Component |
| app_version | Version number of the service or payment provider app |
| bssid | Base Service Set Identifier (MAC address) of the WiFi access point the device is currently connected to (if any) |
| cell_id | Identifier of the current cell site |
| comp_version | Version number of the Risk Component |
| conf_version | Version number of the configuration file used |
| conn_type | Type of the current network connection ("wifi" or "cellular") |
| device_id | Device Id as reported by the OS (IMEI for GSM phones, MEID for CDMA phones) |
| device_model | Phone model |
| device_name | User-supplied name of the device |
| device_uptime | Time since last reboot of the operating system (in milliseconds) |
| email_configured | Whether there is an email account set up on the device |
| ip_addrs | IP address of the device |
| known_apps | List of apps that are currently installed on the device (from a set list to check) |
| line_1_number | Device phone number (MSISDN) |
| linker_id | The linker id that has been assigned to this device. It's shared across applications. |
| locale_country | The country code for the locale the device is set to |
| locale_lang | The language code for the locale the device is set to |
| location | Location of the device. object containing latitude (lat), longitude (lng), accuracy (acc), and timestamp of when it was collected (timestamp) |
| location_area_code | GSM location area code of the current cell site |
| location_auth_status | Whether the app has been granted location permissions |
| mac_addrs | MAC address of the device |
| notif_token | APNS token given to the device |
| os_type | OS currently running. "iOS" or "Android" |
| os_version | Currently installed version of the OS |
| payload_type | The payload type. "full" or "incremental" |
| phone_type | The device phone type. This indicates the type of radio used to transmit voice calls. "gsm", "cdma" or "none" |
| pin_lock_last_timestamp | Last time at which the device was known to be locked using a pin code |
| risk_comp_session_id | The Risk Component session id. A new session id is generated every time a full update is created and sent |
| roaming | Current roaming indicator of phone |
| sim_operator_name | The Service Provider Name (SPN). |
| sim_serial_number | The serial number of the SIM, if applicable. |
| sms_enabled | Whether text messaging is enabled on the device. |
| ssid | SSID (network name) of the WiFi network the device is currently connected to (if any) |
| subscriber_id | The unique subscriber ID, for example, the IMSI for a GSM phone. |
| timestamp | Unix timestamp of risk blob creation time (in milliseconds). |
| total_storage_space | Total size of the storage available on the device |
| tz_name | Name of the time zone the device is set to (as reported by the operating system) |

By combining one or more of these fields on a mobile device, it is possible to compute a unique fingerprint for the device that can be used to identify that device in transactions. Note that the device fingerprint does not need to include all of the above parameters and can include parameters not listed above. In one embodiment, a copy of data for a specific user device can be maintained on the service or payment provider servers and the client or user would simply be identified by a numeric identifier. In the event where there is some suspicion with respect to the number identifier being spoofed, the full fingerprint from the device can be compared with a server copy to ensure consistency.

Every device using a web browser to access the internet is identified by its Internet Protocol address also known as its IP address. With every internet interaction, the device automatically sends a multitude of information about the user agent (=web browser) to the web server it is connecting to. Additionally, a large number of other information about the device can be determined using the JavaScript capabilities that are unique to the browser.

The result of combining all of these values is a very high probability in being unique among millions of devices. Specifically, the values that commonly used are:

The user agent string as sent by the browser
Display resolution and color depth information
An extensive listing of all browser plugins installed
The operating system running the browser The computed fingerprint value, in one embodiment, is represented as a 128-bit hash value by applying the Message-Digest algorithm 5 (MD5) on the concatenated values. There is a very low possibility that two completely unrelated devices will generate the same fingerprint. For this reason, the present fraud solution assigns each device a universally unique identifier (UUID), which is essentially guaranteed to be unique. For example, the probability of one duplicate UUID would be about 50% if every person on earth owns 600 million UUIDs. Each UUID is internally associated with the fingerprint of the device, but is not the same as the device fingerprint. A UUID may be created using a random number generator and universal time (to very high precision). In one embodiment, when a UUID is newly created, it is checked to see if the same UUID already exists. If so, another UUID is generated for the device.

The UUID may be stored on the user's system using both standard browser cookies and Flash local shared objects (LSOs). In case the user deletes either one of those, the respective other is automatically recreated. In case the user clears both storage mechanisms at the same time, the system may be able to retrieve the UUID based on the user's fingerprint, taking additional security measures into account, such as matching IP addresses.

The UUID may be used in conjunction (such as to identify scores associated with the particular device) with a device profile, a device reputation, and/or an IP reputation score, as will be discussed below. The resulting score may then be used by a server of the system receiving the transaction request to help determine the risk level or trust level of the device or otherwise authenticate the device.

Device Profile

A device profile may be based on a collection of device attributes (which may be used to fingerprint the device) that can be used to assess a device for "riskiness," Device attributes may include one or more of the ones listed above. Device profile may include some or all the elements that make up a device, e.g., jail break status, IP connectivity, locale settings, etc. In other words, the device profile may be the pieces of information specific to the device that can be profiled as being "risky" or trustworthy. A device profile may be represented as a score or in other formats, so that a system can determine a trust level based on the profile or be able to accurately compare one device profile to other devices with similar or same profiles.

Device Reputation

By utilizing device fingerprinting, it is possible to uniquely identify a device and assign a certain trust or reputation score to the device. This device reputation score may be a numerical value, e.g., between 1.0 and 10.0, representing whether the device has shown good or bad activity in the past, thus indicating to which degree this device can be trusted.

Every time a device interacts with the system, such as by making a transaction request, making a transaction, authenticating, adding/deleting apps, etc., all of the connection related parameters are recorded and stored in the database as device history data.

Each interaction with the system can also be classified into how trustworthy or how fraudulent this particular request to the server appears to be. Examples of suspicious activity could be:

Using a proxy server with a large client-proxy distance
The device is showing large geo-movements within short periods of time
Bot-like behavior when filling out forms/navigating websites
Frequent IP address changes
Transactions at a higher than normal frequency On the other hand, examples of good behavior could include:

Directly connecting to the web server with no proxy used
Showing stability in terms of geo movement and IP addresses used
Human-like behavior when filling out forms/navigating websites By taking into account the complete device history data a certain device has generated within the system, a device reputation or trust score is calculated. Each time the device has shown suspicious activity, the score gets negatively updated or affected. Similarly, a device history containing entries showing good behavior positively updates or affects the score. In one embodiment, the increases in score are additive in nature. For each "good" transaction (e.g., transactions not resulting in charge backs or declines), the device score increases by a small linear amount that is fixed in nature. In one embodiment, the decreases are exponential in nature, for each bad transaction the device score is affected significantly and proportional to the value of the score itself.

In one embodiment, device reputation or trust focuses solely on device specific data and actions and is independent from the connection that is being used for the current request. In one example, a device reputation or trust score can be computed with an algorithm similar to how TCP does congestion control for internet packets. The additive increase/multiplicative decrease (AIMD) algorithm achieves additive increase and multiplicative decrease using a feedback control. For example, every good action contributes to an increase in reputation/trust score in an additive manner (+1) but any negative event will decrease trust in a multiplicative manner (/x).

In another embodiment, the device trust score combines the device specific data and actions (e.g., the device fingerprint) with one or more other scores or indicators, such as IP reputation, discussed below.

IP Reputation

Similar to device reputation, the IP reputation score is a value that represents the trustworthiness of a specific IP address. IP reputation is particularly important in the case where a completely new device connects where there is no meaningful device reputation score available.

The calculation of the IP reputation or network score may be partly based on the device reputation or trust scores. When a new device reputation score has been calculated for a specific device, all previous IP addresses that this device has used may be recalculated. Furthermore, not only is the exact IP address affected but also parts of it. For example, if there has been fraudulent activity from IP address 12.12.12.12, then this makes a request from IP address 12.12.12.23 slightly more suspicious compared to a request from a non-related IP address.

However, unlike a device QUID, an IP address usually changes over time, so the significance of an IP address rating decreases as the timestamp of the last update ages.

Additionally various other connection parameters may play an important role when calculating the IP reputation score, for example:

Connection and routing type information (e.g. fixed connection or dialup)
The number of unique devices (UUIDs) that connect over the same IP address
The country the IP address located in
Whether the IP address is part of the AOL network
Whether the IP address originates from a corporate network Depending on the characteristics of the connection, the score can be positively or negatively affected. In one embodiment, IP reputation focuses solely on connection specific data and is independent from the device that is connecting over this IP address. An additive increase/multiplicative decrease (AIMD) algorithm can be used to determine and update the IP reputation score.

Overall Fraud Score

A combination of device reputation and IP reputation may be used as an overall trust score for the device. In one embodiment, the total trust score is the sum of the device reputation score, the IP/Network reputation score, and the device profile score. Each of these scores may also be weighted if importance was not accounted for in the determination of these scores.

So in this case a device with a good reputation on a bad/previously compromised network or a device with a good reputation with a potentially compromised profile would be treated as a less trustworthy than one with a known good profile and good reputation.

By using this combination, the overall score of a "good" device will be degraded when connecting over a bad IP address. This might be the case when a computer that is mostly used at home now connects over a public Wi-Fi network at an airport.

In a similar way, a good IP score will worsen when bad devices connect through it. This might be the case when fraudsters illegally gain access to a secure home network.

FIG. 1 is a flow diagram illustrating a process 100 for assigning a fraud or trust score. Process 100 may begin in response to a server, such as managed or controlled by a service or payment provider, receiving a transaction request (e.g., a payment request), determining, at step 102, whether the device has a corresponding UUID. If not, the server may determine, at step 104, whether the device has a known device fingerprint. If not, the server may create a new UUID for the device, and assign a default device score. If the device does have a known device fingerprint, then the server may retrieve the assigned UUID, at step 106, using the device fingerprint. Once it is determined that the device has a UUID (either at step 102 or at step 106), the server obtains the device score at step 108, such as from a search of one or more databases.

However, if the device requesting the transaction does not have a UUID or a known device fingerprint, the server may create, at step 110, a new UUID for the device. After the UUID is created and assigned the device, a default device score and a default IP score is assigned to the device at step 112. When a new device comes into the system, the device characteristics are analyzed to see how devices with similar or same characteristics have behaved in the past. The reputation/trust score is periodically altered to reflect any changes in profile of the device. Once assigned, the device score and the IP score may be stored and associated with the device, such as through the device UUID.

Once the device score is obtained or assigned for the requesting device, the IP reputation score is obtained at step 114. This may be accomplished by searching one or more databases based on the device UUID. The server then calculates risk (such as through a trust score) based on the device reputation score, the IP reputation score, and the device profile score. This risk may be referred to as the total reputation score or a total fraud score, obtained at step 118. Note that the total reputation score may utilize additional scores, a subset of the above scores, or other combinations of information. The fraud score may be used by the service provider, along with other information, to authorize, deny, or request additional information in response to a transaction request.

Figure 2:
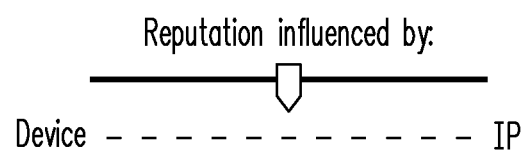
FIG. 2 is an exemplary block diagram illustrating that merchants may have the ability to set an individual preference in what weighting is applied when computing a score.

FIG. 2 is a block diagram illustrating one embodiment in which merchants may have the ability to set an individual preference in what weighting is applied when computing the overall fraud score. As shown, merchants may be allowed to choose the weights applied to the device and IP scores via a slider bar displayed on a web page for example.

When more weight is set on the device side, the merchant pays more attention to known devices than the connection that is being used by the devices. Vice versa, more weight on the IP side makes connection-related matters more important, paying less attention to the individual devices that connect through the connections. In one embodiment, the weighting is equal between the device reputation score and the IP reputation score.

In other embodiments, a merchant can select a weight for the device profile score as well. For example, the merchant may see the three (or more or less) scores, each with a percentage box or slider. The merchant can then select or enter the desired percentage for each score, ranging from 0 to 100. If the total is more than 100, the system may notify the merchant to adjust one or more scores so that the total is 100. The system may also suggest recommended weights based on the merchant, the system's own analysis, and other information. In still other embodiments, the weights may be determined solely by the service provider system, such as based on the system risk analysis procedures, which may be merchant-specific and be based on different factors, such that the weights are not always the same between different or even the same merchant.

Figure 3:
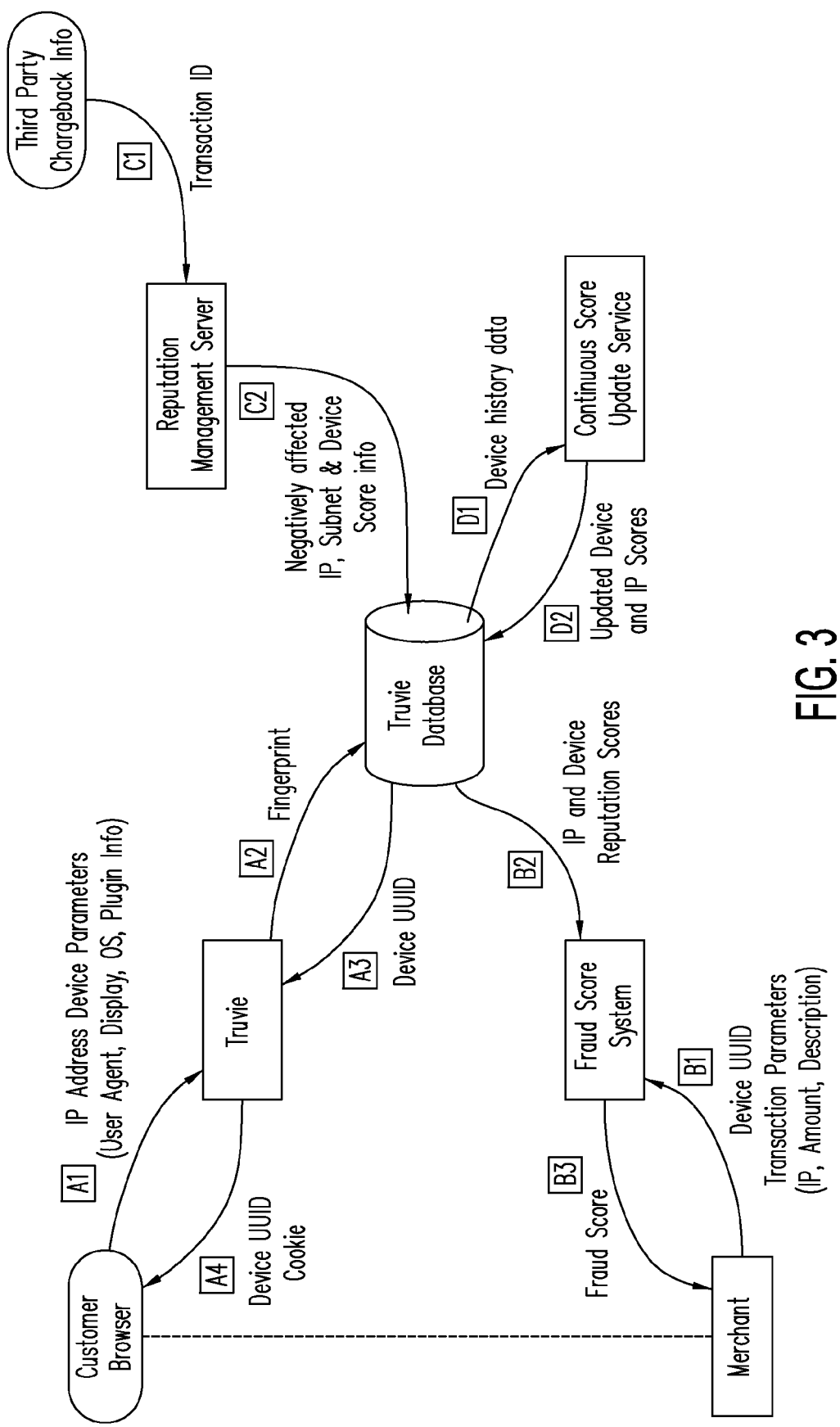
FIG. 3 is a data flow diagram illustrating an overall process of using device reputation according to one embodiment.

FIG. 3 is a data flow diagram illustrating an overall process 300 according to one embodiment. In step A1, the customer browser or device sends information to the server from a merchant site or app. The information may be a transaction request, such as a payment request, including a payment amount, device/user identifier(s), and/or merchant information. In step A2, the server queries the database for the device fingerprint. In step A3, the database returns the device UUID in the case where the device fingerprint has been submitted previously. In step A4, the server sends to the customer browser or device a UUID cookie.

In step B1, a merchant system (from which a payment transaction from the customer browser is being attempted) requests a fraud score for the UUID and transaction parameters. In step B2, the IP reputation score, the device profile score, and/or the device reputation score are retrieved from a database and sent to or processed by a fraud score system or service/payment provider system or server. In step B3, the system calculates and returns the fraud score.

In step C1, a third-party informs a reputation management server about a chargeback using a transaction ID. In step C2, based on the transaction ID, the reputation management server negatively adjusts the IP reputation score, the device profile score, and/or the device reputation score in the database as needed. Other information may also be reported, which can positively or adversely affect one or more scores discussed herein.

In step D1, a continuing score update service continuously pulls transaction history data from the database, and after processing, any updated IP reputation score, device profile score, and/or device reputation score are written back to the database for future use in step D2. The scores may then be used to calculate a total fraud score, which the merchant and/or the service provider may use to determine whether to approve, deny, or request additional information for the transaction request.

Note that the various steps and services discussed above need not be performed by the corresponding systems, entities, and services, but instead can be performed by a single service provider or different combinations of entities and systems.

Figure 4:
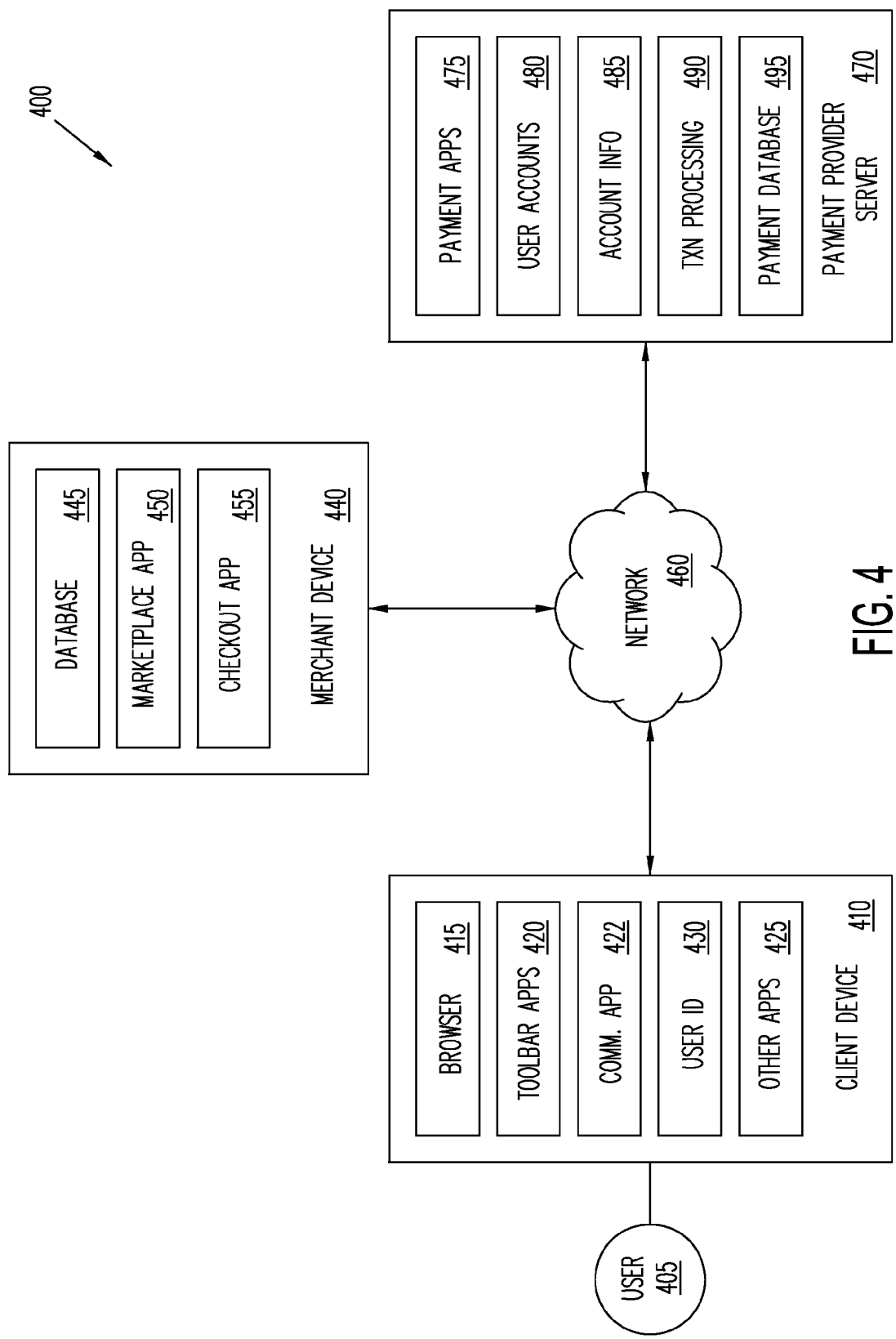
FIG. 4 is a block diagram of a networked system using a fraud score in a transaction between a user and a merchant via a service/payment provider, according to an embodiment of the invention.

FIG. 4 is a block diagram of a networked system 400 using a fraud score in a transaction between a user and a merchant via a service/payment provider, such as described above, according to an embodiment of the invention. System 400 includes a client device 410, a merchant device 440, and a payment service provider server 470 in communication over a network 460. Payment service provider server 470 may be maintained by a payment provider, such as PayPal, Inc. of San Jose, Calif. Server 470 may be maintained by other service providers in different embodiments.

Network 460, in one embodiment, may be implemented as a single network or a combination of multiple networks. For example, in various embodiments, network 460 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client device 410, in one embodiment, may be implemented using any appropriate combination of hardware and/or software configured for wired and/or wireless communication over network 460. For example, client device 410 may be implemented as a smart phone of a user 402 (e.g., a client or customer) in communication with network 460. In other examples, client device 410 may be implemented as a computing tablet, a PC, personal digital assistant (FDA), notebook computer, and/or various other generally known types of wired and/or wireless computing devices. It should be appreciated that, in various embodiments, client device 410 may be referred to as a user device or a customer/client device without departing from the scope of the present disclosure.

Client device 410, in one embodiment, may include one or more browser applications 415 which may be used to provide a user interface to permit user 402 to browse information available over network 460. For example, browser application 415 may be implemented as a web browser to view information available over network 460. In one implementation, browser application 415 comprises a software program, such as a graphical user interface (GUI), executable by a processor that is configured to interface and communicate with the one or more merchant devices 440 and payment provider server 470 via network 460. For example, user 402 is able to access merchant websites to find and purchase items. User 402, through client device 410, may also communicate with payment provider server 470 to create an account and make a payment to the merchant.

As such, client device 410, in one embodiment, may include other applications 425 as may be desired in one or more embodiments to provide additional features available to user 402. For example, applications 425 may include interfaces, apps, and communication protocols that allow the user to receive and transmit information through online sites and payment provider server 470. Applications 425 may also include security applications for implementing client-side security features, programmatic client applications for interfacing with appropriate application programming interfaces (APIs) over network 460 or various other types of generally known programs and/or applications. Client device 410 may also include a location application that enables the location of the client device to be determined and conveyed to others, such as a payment provider. Such applications are commonly known.

Client device 410 may also include tool bar applications 420 that enable user 405 to navigate through both the device and sites/apps accessed through the device, communication apps 422 that enable device 410 to communicate with devices through network 460, such as device identifiers and other device software and hardware information used for a device profile, IP network reputation, and/or device reputation score, and user ID apps 430 that associate user identifiers with the device.

Merchant device 440, which can be similar to client device 410, may be maintained by one or more service providers (e.g., merchant sites, auction site, marketplaces, social networking sites, etc.) offering various items, such as products and/or services, through stores created through the service provider or their websites. Merchant device 440 may be in communication with a merchant server capable of handling various on-line transactions. The merchant (which could be any representative or employee of the merchant) can process online transactions from consumers making purchases through the merchant site from mobile devices. Merchant device 440 may include purchase application 442 for offering products/services for purchase.

Merchant device 440, in one embodiment, may include a database 445 that stores information about products/items offered by the merchant, as well as merchant information and identifiers and customer accounts and other customer information. One or more marketplace apps 450 enable the merchant to provide offerings on a merchant app or website to customer and allow customers to make purchases through the merchant app or website. A checkout app 455 is provided to process a payment or purchase of merchant offerings by customers, where checkout app 455 can communicate with other devices on the network, including details (both positive and negative) of specific transactions, which may affect the overall trust or fraud score associated with a device or network.

Payment provider server 470 may be maintained, for example, by an online payment service provider which may provide payment between user 405 and the operator of merchant server 440. In this regard, payment provider server 470 includes one or more payment applications 475 which may be configured to interact with user device 410 and/or merchant server 440 over network 460 to facilitate the purchase of goods or services, communicate/display information, and determine/update trust scores and as discussed above.

Payment provider server 470 also maintains a plurality of user accounts 480, each of which may include account information 485 associated with individual users, including travel account information for users. For example, account information 485 may include private financial information of users of devices such as account numbers, passwords, device identifiers, user names, phone numbers, credit card information, bank information, trust scores associated with devices corresponding to a user account, as discussed above, or other financial information which may be used to facilitate online transactions by user 405. Advantageously, payment application 475 may be configured to interact with merchant server 440 on behalf of user 405 during a transaction with checkout application 455 to process a transaction request utilizing, in part, device and network trust scores.

A transaction processing application 490, which may be part of payment application 475 or separate, may be configured to receive information from a user device and/or merchant server 440 for processing and storage in a payment database 495. Transaction processing application 490 may include one or more applications to process information from user 405 for processing a transaction/payment request, including determining and updating trust scores as described herein. As such, transaction processing application 490 may store details of a payment request from a user or merchant. Processing application 490 may also include a random number generator for generating and assigning UUIDs to devices.

Figure 5:
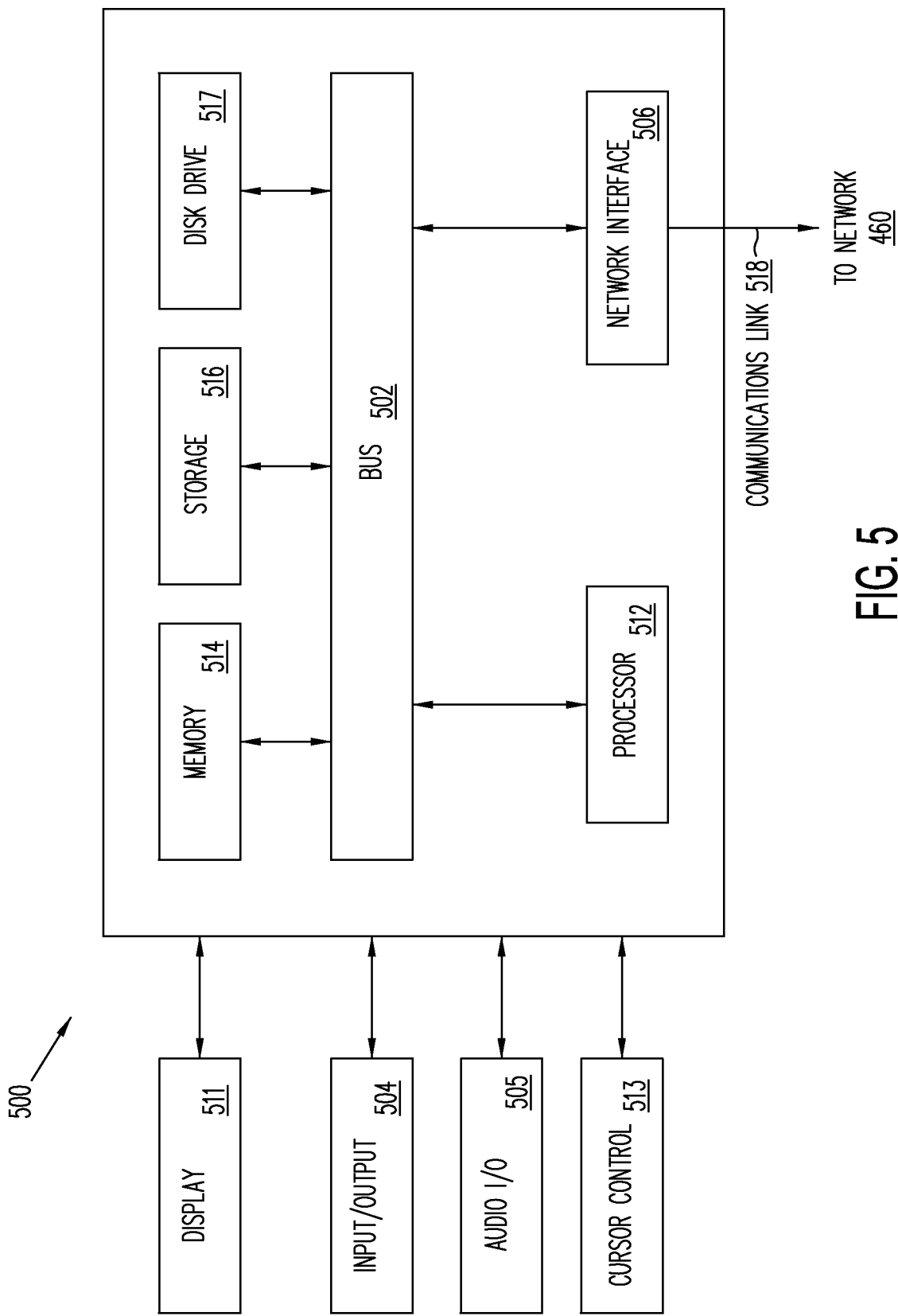
FIG. 5 is a block diagram of a computer system suitable for implementing one or more components described herein according to one embodiment.

FIG. 5 is a block diagram of a computer system 500 suitable for implementing one or more embodiments of the present disclosure. In various implementations, the user and/or merchant device may comprise a personal computing device (e.g., a personal computer, laptop, smart phone, PDA, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 500 in a manner as follows.

In accordance with various embodiments of the present disclosure, computer system 500, such as a personal computer and/or a network server, includes a bus 502 or other communication mechanism for communicating information, which interconnects subsystems and components, such as a processing component 504 (e.g., processor, micro-controller, digital signal processor (DSP), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 516 (e.g., keyboard, keypad, or virtual keyboard), and a cursor control component 518 (e.g., mouse, pointer, or trackball). In one implementation, disk drive component 510 may comprise a database having one or more disk drive components.

In accordance with embodiments of the present disclosure, computer system 500 performs specific operations by processor 504 executing one or more sequences of instructions contained in system memory component 506, such as described above with respect to the consumer, merchant, and/or payment provider. Such instructions may be read into system memory component 506 from another computer readable medium, such as static storage component 508 or disk drive component 510. In other embodiments, hard-wired circuitry may be used in place of or in combination with software instructions to implement the present disclosure.

Logic may be encoded in a computer readable medium, which may refer to any medium that participates in providing instructions to processor 504 for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component 510, volatile media includes dynamic memory, such as system memory component 506, and transmission media includes coaxial cables, copper wire, and fiber optics, including wires that comprise bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by a communication link 520 to the network (e.g., such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 520 and a communication interface 512. Network interface component 512 may include an antenna, either separate or integrated, to enable transmission and reception via communication link 420. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

What is claimed is:

1. A system comprising:
   a memory storing account information for a plurality of users, wherein the account information comprises a user identifier and an overall trust score for a device corresponding to a user account; and
   a processor operable for:
   receiving a transaction request from a user device, wherein the transaction request includes a payment request using a payment provider server; and
   determining the overall trust score for the transaction request, wherein the overall trust score is based on a device reputation score, a device profile score, and a network reputation score, wherein a weight of the network reputation score in the overall trust score decreases with an increasing length of time since an update of the network reputation score, and
   wherein the update is based on an additive increase/multiplicative decrease (AIMD) algorithm.

2. The system of claim 1, wherein at least one of the device reputation score and the network reputation score are based on previous transactions and results of the previous transactions using the user device.

3. The system of claim 1, wherein the device profile score comprises attributes that make up the user device.

4. The system of claim 1, wherein the overall trust score is updated for the user device based on changes to the user device and/or activities engaged in by the user device.

5. The system of claim 1, wherein the processor is further operable for creating a new unique identifier for the user device if the user device does not have a unique identifier or a device fingerprint.

6. The method of claim 5, wherein the creating comprises randomly generating a number.

7. The method of claim 1, wherein the device reputation score and the network reputation score are updated for the user device based on changes to the user device and/or activities engaged in by the user device.

8. The method of claim 1, wherein the network reputation score is based on transactions conducted through the same or similar IP addresses as an IP address for the transaction request.

9. The method of claim 1, wherein the device profile score is based on scores of devices similar to the user device.

10. A non-transitory machine-readable medium comprising a plurality of machine-readable instructions which when executed by one or more processors of a server are adapted to cause the server to perform a method comprising:
   receiving a transaction request from a user device, wherein the transaction request includes a payment request using a payment provider server; and
   determining an overall trust score for the transaction request, wherein the overall mast score is based on a device reputation score, a device profile score, wherein a weight of the network reputation score in the overall trust score decreases with an increasing length of time since an update of the network reputation score, and wherein the update is based on an additive increase/multiplicative decrease (AIMD) algorithm.

11. The non-transitory machine-readable medium of claim 10, wherein at least one of the device reputation score and the network reputation score are based on previous transactions and results of the previous transactions using the user device.

12. The non-transitory machine-readable medium of claim 10, wherein the device profile score comprises attributes that make up the user device.

13. The non-transitory machine-readable medium of claim 10, wherein the overall trust score is updated for the user device based on changes to the user device and/or activities engaged in by the user device.

14. The non-transitory machine-readable medium of claim 10, wherein the method further comprises creating a new unique identifier for the user device if the user device does not have a unique identifier or a device fingerprint.

15. The non-transitory machine-readable medium of claim 14, wherein the creating comprises randomly generating a number.

16. The non-transitory machine-readable medium of claim 10, wherein the device reputation score and the network reputation score are updated for the user device based on changes to the user device and/or activities engaged in by the user device.

17. The non-transitory machine-readable medium of claim 10, wherein the network reputation score is based on transactions conducted through the same or similar IP addresses as an IP address for the transaction request.

18. The non-transitory machine-readable medium of claim 10, wherein the device profile score is based on scores of devices similar to the user device.

19. A method, comprising:
   receiving, electronically by a processor of a service provider, a transaction request from a user device, wherein the transaction request includes a payment request using a payment provider server;
   determining a device profile score for the user device based on a user device identifier;
   determining a device reputation score for the user device, wherein the device reputation score is based, at least partly, on previous transactions and results of the previous transactions using the user device;
   determining a network reputation score for a network addressed used in the transaction request, wherein the network reputation score is based, at least partly, on transactions conducted through the same or similar IP addresses as an IP address for the transaction request;
   determining an overall trust score for the transaction request based on the device profile score, the device reputation score, and the network reputation score, wherein a weight of the network reputation score in the overall trust score decreases with an increasing length of time since an update of the network reputation score, and wherein the update is based on an additive increase/multiplicative decrease (AIMD) algorithm; and
   updating one or more of device profile score, the device reputation score, and the network reputation score based on results of the transaction request.

\* \* \* \* \*